United States Patent [19]

Moll

[11] 4,104,969
[45] Aug. 8, 1978

[54] ARRANGEMENT FOR IMPROVING THE BURNING EFFICIENCY OF A ROCKET-BORNE SOLID PROPELLANT CHARGE CARTRIDGE

[75] Inventor: Manfred Moll, Dusseldorf, Fed. Rep. of Germany

[73] Assignee: Rheinmetall GmbH, Dusseldorf, Fed. Rep. of Germany

[21] Appl. No.: 767,379

[22] Filed: Feb. 10, 1977

[30] Foreign Application Priority Data

Feb. 13, 1976 [DE] Fed. Rep. of Germany ....... 2605768

[51] Int. Cl.$^2$ .............................................. F02K 9/04
[52] U.S. Cl. .................................... 102/49.3; 60/256; 60/271; 102/49.4
[58] Field of Search .................................. 60/253–256, 60/271; 102/49.3–49.8

[56] References Cited

U.S. PATENT DOCUMENTS

| 1,347,125 | 7/1920 | Schneider | 102/49.7 |
| 2,426,239 | 8/1947 | Renner | 102/49.7 |
| 3,011,309 | 12/1961 | Carter | 60/253 |
| 3,306,204 | 2/1967 | Throner, Jr. | 60/255 |

Primary Examiner—Verlin R. Pendegrass

[57] ABSTRACT

An improved arrangement for more efficiently igniting and thereafter maintaining an optimum burning efficiency of a hollow, solid propellant charge cartridge disposed in a combustion chamber at the rear end of a rocket or other ballistic projectile is described. A support tube is mounted for extension coaxially into the hollow interior of the charge cartridge with a radial clearance therebetween. The rear end of the support tube is carried within the locking member at the rear end of the combustion chamber, so that upon bursting of a rupture disc between the locking member and the rear end of the combustion chamber, both the locking member and the support tube can be propelled axially rearwardly out of the combustion chamber. The advantageous function of the support tube to absorb radial acceleration forces during firing of the rocket, is preserved, while thereafter the deleterious effect of having the support tube remain in place during the ignition of the main propellant charge is obviated.

8 Claims, 2 Drawing Figures

ARRANGEMENT FOR IMPROVING THE BURNING EFFICIENCY OF A ROCKET-BORNE SOLID PROPELLANT CHARGE CARTRIDGE

BACKGROUND OF THE INVENTION

The invention relates to rocket shells or other ballistic projectiles adapted to carry a hollow solid propellant charge cartridge within a rear combustion chamber thereof.

In a known arrangement of this type, the hollow propellant charge cartridge is supported in the front portion of the combustion chamber, and a support tube is mounted within the chamber for engagement with the wall of the hollow aperture in the cartridge. The tube serves to absorb radially inward directed forces exerted on the propellant charge when the rocket is discharged from the firing weapon. A nozzle is fixedly arranged in the rear end portion of the ballistic projectile to serve as an exit for the high temperature propellant gas developed in the combustion chamber. A cover is detachably fixed to the rear end mouth of the nozzle to close the combustion chamber, or within the support tube, or at the inner surface of the detachable cover, as well.

This support tube acts as a heat reflector to the adjacent ignited surface of the propellant charge, which is a drawback, because unavoidable temperature gradients within said surface result in a harmful inequality of the burning off rate. The aforementioned facts give rise to erosions in the ignited surface of the propellant charge, said erosions being aggravated by the high-velocity flow of the high-temperature propellant gas. These erosions impair the stereoscopic relationship of the propellant charge resulting in an impaired action, and, consequently, in impaired flying characteristics including harmful deviations from a desired flight path of the ballistic projectile.

SUMMARY OF THE INVENTION

Such disadvantages are overcome with the arrangement of the present invention for improving the burning efficiency of such propellant charge cartridge. In an illustrative embodiment, the support tube is mounted for extension coaxially into the hollow interior of the charge cartridge with a radial clearance therebetween. In addition, the rear end of the support tube is carried within the locking member at the rear end of the combustion chamber, so that upon the above-mentioned bursting of the rupture disc between the locking member and the rear end of the combustion chamber, both the locking member and the support tube can be propelled axially rearwardly out of the combustion chamber. In this way, the advantageous function of the support tube, i.e., to absorb radial acceleration forces during firing of the rocket, is preserved, while thereafter the deleterious effect of having the support tube remain in place during the ignition of the main propellant charge is obviated.

A nozzle member is removably secured in coaxial fashion to the front end of the support tube within the central aperture of the cartridge, and the primer charge itself is positioned within the support tube to provide an efficient, space-saving ignition path between such primer and the front surface of the propellant charge via the support tube and the nozzle.

Advantageously, the periphery of the nozzle extends radially outwardly beyond the periphery of the associated support tube, though still in spaced relation to the surrounding wall of the central aperture of the propellant charge. A nozzle-engaging central constriction of the wall of the combustion chamber, located behind the rear surface of the charge cartridge, cooperates with the nozzle to receive and retain the nozzle in operative position outside of the cartridge when the support tube is propelled axially rearwardly, whereby the releasable connection between the nozzle and the support tube is broken to permit the support tube to move freely beyond the constriction and out of the now-opened rear end of the combustion chamber.

Advantageously, the primer arrangement may include a time fuse and a primer charge affixed forwardly thereto within a rear portion of the support tube, such rear portion in turn being received within a front central recess of the releasable locking member.

In order to further improve the efficiency of burning of the propellant charge, the heat rays emanating from the primer when the latter is detonated may be coupled to intermediate portions of the inner peripheral wall of the hollow projectile by means of a plurality of radial openings extending through the wall of the support tube.

Advantageously, the constricted recess in the wall of the combustion chamber behind the propellant charge may be frusto-conical in shape for receiving a complementary frusto-conical outer periphery of the nozzle when the support tube is accelerated rearwardly out of the propellant charge and through the constriction.

BRIEF DESCRIPTION OF THE DRAWING

The invention is further set forth in the following detailed description taken in conjunction with the appended drawing, in which.

DETAILED DESCRIPTION

Figure 1:
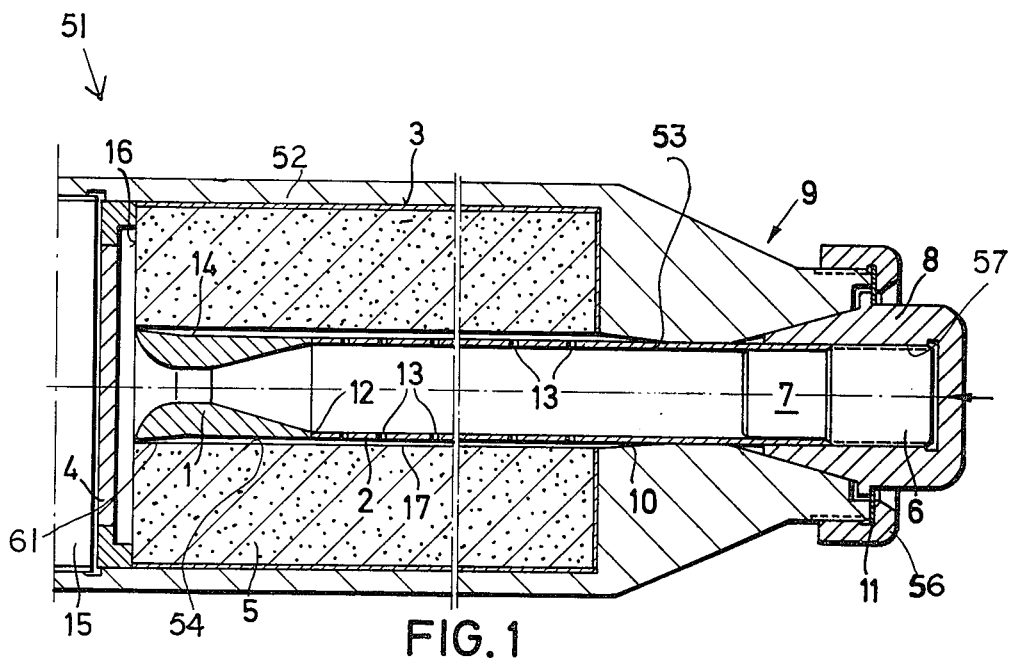
FIG. 1 is an axial view, in section, of a rear portion of a rocket shell or other ballistic projectile, illustrating an arrangement in accordance with the invention for improving the burning efficiency of a hollow propellant charge cartridge situated within a rear combustion chamber of the projectile, such arrangement being shown prior to the ignition of the charge cartridge.

Referring now to the drawing, FIG. 1 illustrates a rear portion of a ballistic projectile 51, illustratively a rocket shell. The illustrated portion includes a shell jacket 52, which radially bounds a combustion chamber 3 within the shell. The chamber 3 is axially bounded forwardly by means of a partition wall 4, which simultaneously forms the rear wall of a payload compartment 15 of the shell 51. The rear axial boundary of the compartment 3 is formed from an enlarged rear portion 9 of the jacket 52, such portion 9 having a central aperture 53, contoured as indicated below, coaxial with and in communication with the chamber 3.

A conventional hollow cartridge 5, consisting of a solid propellant, is coaxially supported within the chamber 3, with a front surface 16 thereof adjacent the front boundary wall 4. The cartridge 5 has a central aperture 54 which, in the depicted arrangement, effectively forms a forward extension of the aperture 53 in the rear jacket portion 9.

The rear end of the aperture 53 in the jacket portion 9 is releasably closed by means of a locking member 8.

The member 8 has a radially projecting flange 56, which is secured by threading or other conventional means on the outer surface of the rear end of the jacket portion 9. A rupture disc or membrane 11 is clamped between the confronting surfaces of the locking member flange 56 and the jacket portion 9, and is adapted to be broken when the pressure differential on opposite sides thereof exceeds a predetermined threshold value; in this case, such value is the pressure generated within the chamber 3 upon the start of ignition of the cartridge 5, as explained below. Upon the puncturing of the disc 11, the main central portion of the locking member 8 separates from the projectile 51, to expose the rear jacket aperture 53 and the cartridge aperture 54 to the atmosphere.

The locking member 8 has a rearwardly opening central recess 57 for receiving a rear end of a support tube 2, which projects forwardly into the central aperture 54 of the cartridge 5. As in the prior art, the function of the support tube 2 is to absorb radially inwardly directed acceleration forces on the cartridge 5 when the associated projectile 51 is discharged from the barrel of the firing weapon (not shown).

An assembly for igniting the solid propellant cartridge 5 is associated with the rear end of the support tube 2. As indicated in FIG. 1, such assembly includes a primer charge 7 mounted within the support tube, and a conventional time fuse 6 which is in engagement with the rear end of the charge 7, and which is disposed as shown within the recess 57 of the locking member 8.

A nozzle member 1 is disposed in the front portion of the aperture 54, and is removably secured, as by a constricted portion 12, to the front end of the support tube 2.

The function of the nozzle 1 is both to cooperate with the support tube 2 to help absorb the radially inwardly directed acceleration forces on the cartridge 5, and also to provide communication between heat rays, emitted by the primer charge 7 when the time fuse 6 is detonated, and the front surface 16 of the cartridge 5 via the support tube 2. The outer periphery, designated 14, of the nozzle 1 is also radially spaced from the adjacent portion of the cartridge wall 17, so that the nozzle and the support tube are movable rearwardly as a unit through the aperture 54 in the manner described below after the locking member 8 is separated from the jacket 3. In addition, a front portion 61 of the outer periphery of the nozzle 1 has a frusto-conical taper thereon which projects radially outward to a dimension larger than the outer dimension of the support tube 2, so that such tapered portion 61 may be engaged and captured by a complementary, frusto-conical inward constriction 10 disposed in the wall of the aperture 53 of the rear jacket portion 9. The inner diameter of the constriction 10 is larger than the outer diameter of the support tube 2, so that the support tube 2 can pass unimpeded through the constriction 10.

A plurality of apertures 13 are disposed in the peripheral wall of the support tube 2 to provide auxiliary communication between the heat rays from the ignited primer charge 7 and the surrounding surface 17 of the cartridge 5, thereby to condition such primer for more efficient burning after the burning operation is initiated on the front surface 16 of the cartridge.

The operation of the arrangement so far described is as follows. When the projectile 51, in the disposition shown in FIG. 1, is discharged from the barrel of the firing weapon, the radially inwardly directed acceleration forces accompanying the twist of the projectile during such discharge will cause the solid propellant to be deformed radially inwardly. Such inward motion is effectively limited and constrained by the outer surfaces of the nozzle 1 and the support tube 2. Once the projectile attains flight, such acceleration forces die away, and the resilient nature of the charge in the cartridge 5 will permit the surface 17 to be restored into its illustrated position in radially spaced relation to the surrounding nozzle 1 and the support tube 2. At this time, the support function of these elements is no longer necessary.

As the flight of the projectile proceeds, the time fuse 6 detonates the primer charge 7, and the resultant heat rays therefrom extend to the surface 17 of the cartridge 5 via the apertures 13 in the tube 2, and also proceed in a main path through the nozzle 1 and into communication with the front surface 16 of the cartridge.

Figure 2:
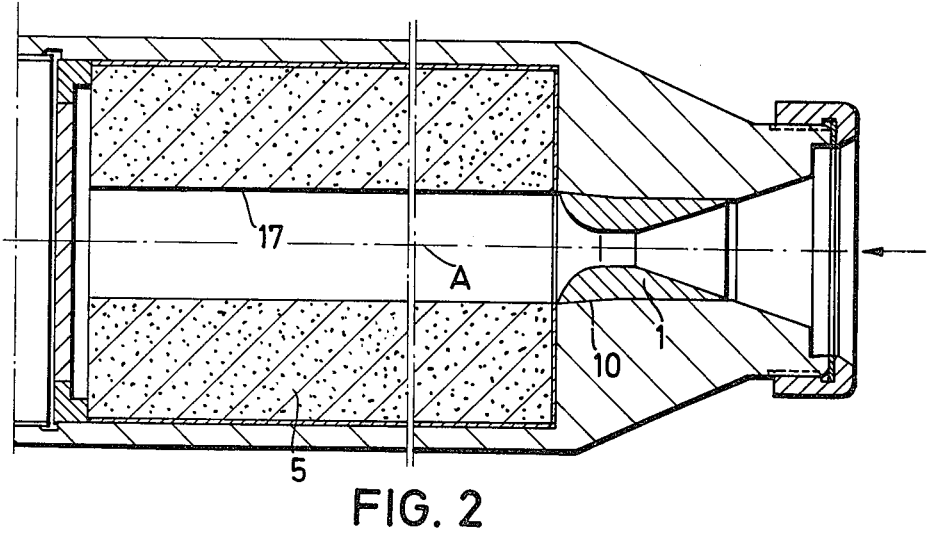
FIG. 2 is an axial view in section of a portion of the arrangement of FIG. 2, illustrating the relationship between the efficiency-improving arrangement and the propellant cartridge after the latter has been ignited.

As the cartridge 5 starts to burn, a high internal pressure is developed in the front end of the chamber 3, which pressure is transmitted through the above-described intervening elements to the front surface of the rupture disc 11. When the pressure has increased to a value beyond the bursting strength of the disc 11, the latter will be punctured, and the sudden release of the pressure will cause the principal central region of the locking member 8 to separate from the rear end of the shell portion 9, so that the chamber 3 is now open rearwardly as indicated in FIG. 2.

Once the locking member 8 has separated, the support tube 2 and nozzle 1, being unrestrained within the central aperture 54 of the cartridge 5, will likewise be propelled rearwardly by the pressure developed in the front end of the chamber 3. The rearward movement of the support tube 2 will be unimpeded during such passage; however, when the tapered wall 61 of the nozzle 1 has moved to the position shown in FIG. 2, i.e., with such tapered portion 61 received within the inward constriction 10 of the aperture 53, further rearward movement of the nozzle 1 will be effectively restrained. Since the pressure in the chamber 3 will continue to be exerted, however, the relatively fragile releasable connection 12 between the support tube and the nozzle will be broken, and the support tube will be propelled outwardly through the now-open rear end of the chamber 3. The nozzle, however, will remain in operative position within the aperture 53, in the manner shown in FIG. 2.

Once this happens, the burning cartridge 5 is now free to contract and expand radially, and will always assume the proper orientation within the chamber 3 as the burning process proceeds. Moreover, since both the nozzle 1 and the support tube 2 are removed from the interior of the projectile 5, the unevenness of burning caused by the auxiliary heat paths, represented in the prior art by the outer surfaces of the support members, is no longer present. As a result, the combustion efficiency of the charge within the cartridge 5 is considerably enhanced.

In the foregoing, an illustrative arrangement of the invention has been described. Many variations and modifications will now occur to those skilled in the art. It is accordingly desired that the scope of the appended claims not be limited to the specific disclosure herein contained.

What is claimed is:

1. In a ballistic projectile, a hollow jacket having a rear wall portion radially bounding a combustion chamber, locking means releasably secured to the rear end of the rear jacket wall portion for closing one end of the chamber, a hollow propellant charge cartridge supported coaxially within the chamber and having a central aperture extending therethrough, tubular support means extending coaxially forwardly through the central aperture of the cartridge from the locking means, a nozzle coaxially and removably secured to the front end of the support tube within the central aperture of the cartridge, the outer periphery of each of the tubular support means and the nozzle being normally in radial spaced relation to the surrounding wall of the central aperture of the cartridge to permit rearward movement of the nozzle and the support means with respect to the cartridge when the locking means are released, and means associated with the interior wall of the jacket rear wall portion rearwardly of the cartridge and cooperable with the nozzle to capture the nozzle within the chamber upon a rearward axial movement of the nozzle and the support means.

2. A projectile as defined in claim 1, in which at least a portion of the periphery of the nozzle projects radially beyond the periphery of the support means, and in which the capturing means comprises an inward constriction of the jacket rear wall portion for engaging and holding the projecting peripheral portion of the nozzle.

3. A projectile as defined in claim 2, in which the projecting portion of the nozzle periphery is substantially frusto-conical in shape, and in which the inward constriction of the rear jacket wall portion has a frusto-conical configuration complementary to the periphery of the projecting portion of the nozzle.

4. A projectile as defined in claim 1, further comprising propellant igniting means associated with the rear end of the support means.

5. A projectile as defined in claim 4, in which the igniting means comprises, in combination, a primer charge unit secured within the support means, and a time fuse in engagement with the rear end of the charge unit.

6. A projectile as defined in claim 1, in which the locking means has a central recess extending rearwardly from a front surface thereof for receiving the rear end of the support means.

7. A projectile as defined in claim 1, further comprising a puncturable rupture disc disposed between the rear end of the jacket rear wall portion and the locking element, the puncturing of the disc serving to release the locking member from the rear jacket wall portion.

8. A projectile as defined in claim 1, in which the periphery of the support means exhibits at least one radial opening extending therethrough.

* * * * *